United States Patent [19]

Schröfelbauer et al.

[11] Patent Number: 4,519,995

[45] Date of Patent: May 28, 1985

[54] METHOD OF DESULFURIZING FLUE GASES OF COAL FIRINGS

[75] Inventors: Herbert Schröfelbauer, Klagenfurt; Gernot Staudinger, Graz, both of Austria

[73] Assignee: Österreichische Draukraftwerke Aktiengesellschaft, Klagenfurt, Austria

[21] Appl. No.: 519,775

[22] PCT Filed: Nov. 19, 1982

[86] PCT No.: PCT/AT82/00034

§ 371 Date: Jul. 11, 1983

§ 102(e) Date: Jul. 11, 1983

[30] Foreign Application Priority Data

Nov. 19, 1981 [AT] Austria ............................... 4992/81

[51] Int. Cl.$^3$ ........................ B01J 8/00; C01B 17/00
[52] U.S. Cl. .................................... 423/244; 110/343; 110/345; 423/242
[58] Field of Search .......... 423/242 A, 242 R, 244 A, 423/244 R; 110/343, 345

[56] References Cited

U.S. PATENT DOCUMENTS

| | | | |
|---|---|---|---|
| 3,505,008 | 4/1970 | Frevel | 23/2 |
| 3,976,747 | 8/1976 | Shale et al. | 423/244 |
| 4,105,744 | 8/1978 | Erdoess et al. | 423/244 |
| 4,185,080 | 1/1980 | Rechmeier | 110/343 X |
| 4,197,278 | 4/1980 | Gehri et al. | 423/244 |

FOREIGN PATENT DOCUMENTS

| | | |
|---|---|---|
| 2625280 | 12/1976 | Fed. Rep. of Germany . |
| 2539500 | 3/1977 | Fed. Rep. of Germany . |
| 1424831 | 12/1965 | France . |

*Primary Examiner*—Gregory A. Heller
*Attorney, Agent, or Firm*—Michael J. Striker

[57] ABSTRACT

In a method for desulfurizing flue gas generated in coal combusting plants, the coal is burned in the presence of a dry additive material, such as CaCO optionally in presence of recycled cold flue gas whereby additive material which has not reacted is discharged together with the flue gas from the firing space and is separated together with the ashes in dust filters. The relative moisture of the flue gas is increased before entering the dust filter so that the sulfur compounds in the flue gas react to a greater extent with the additive material in the dust filters. The device for practicing this method comprises a heat exchanger and/or an injection cooler arranged streamup of the flue gas filtering installation.

5 Claims, 4 Drawing Figures

METHOD OF DESULFURIZING FLUE GASES OF COAL FIRINGS

The invention relates to a method of desulfurizing flue gases generated in a coal firing operating according to the dry additive process and being provided with dust filters. Furthermore the invention concerns a device for practising this method.

In operating large-scale combustion plants, such as for example steam-generating plants for steam turbines, pollution control must be observed to an increasing extent. In particular the rate of emission of pollutants of the combustion plants has to be kept as low as possible. On the other hand, economy as well as low operational costs make it necessary to fire coal of lower quality, in particular lignite of this country, which in combustion produces a relatively high percentage of pollutants. Especially the concentration of sulfur in the form of sulfur dioxide and sulfur trioxide in the flue gases is of concern. In desulfurizing powerplant flue gases, it is in the first place the cost considerations which determine the applicability of a particular desulfurizing method as the equipment for desulfurizing exhausted flue gases requires a considerable apparatus expense and consequently high investment.

In order to reduce emission of sulfur during the firing, a method has already been devised according to which the so-called dry additives have been charged in the combustion space of the plant so as to chemically bind the sulfur constituents of the flue gases as far as possible. This known method uses particularly fine-grain calcium oxide or calcium carbonate blown into the firing space. In coal dust firing plants provided with a grinding and drying recycle system, the calcium oxide is admixed to the coal already before the coal is pulverized in the grinding mill. Both constituents are then fed together through the coal dust burner into the firing space or combustion chamber. This known dry additive process, however, does not yield satisfactory results under all circumstances, and among other factors the kind of coal employed plays its part. It has been found that the desulfurization is insufficient for some kinds of lignite, since apparently due to high temperatures in the firing space the admixed calcium oxide is burned out.

Furthermore, it has already been proposed to convey cold flue gas into the combustion chamber in order to optimize the temperature conditions for the reaction of the additives with the sulfur resp. with the respective sulfur compounds contained in the flue gas. A device operating according to this method will be described below.

The method according to this invention is characterized in the first place that the relative moisture of the flue gas is increased before its entry into the dust filters. According to another feature of this invention, the increase of the relative moisture of the flue gas can be achieved by cooling of the same to a lower temperature which, however, is above the condensation point of water in the flue gas. In particular, the increase of the relative moisture of the flue gas is accomplished by cooling the latter by means of a heat exchanger and/or by injection or spraying of water in the flue gas. The device for carrying out the method of this invention comprising a combustion chamber and filtering equipment for the flue gas is characterized by the provision of a heat exchanger and/or of a spray cooler arranged in the path of the discharged flue gas before its entry into the filtering equipment, so as to increase the relative moisture of the flue gas.

In the following the invention is described in more detail by way of example with reference to the drawings.

Figure 1:
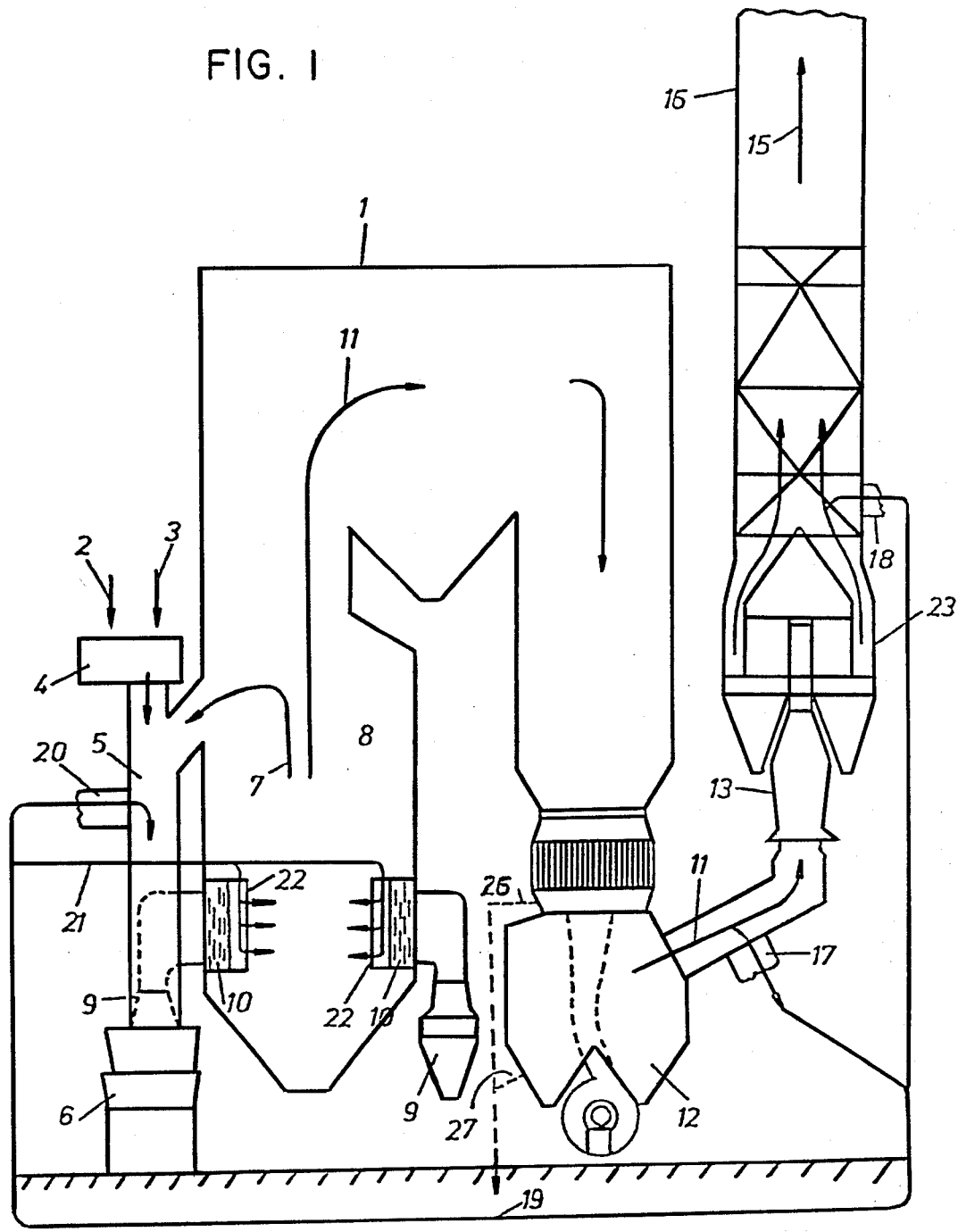
FIG. 1 is a schematic diagram of a combustion plant with coal dust firing having been omitted all parts not being of significance in this connection.

The burner installation shown in FIG. 1 is provided with combustion space for firing coal dust and for desulfurizing by means of dry additives as known per se. As it has been proposed already by the applicant cold flue gas is recycled into the firing space for improving the effectiveness of the desulfurization.

Lignite 2 and the additive 3 $CaCO_3$ are fed in adjustable quantities via conveying means into a common distributing or feeding device 4 and in the drop shaft 5. The drop shaft leads into the coal grinder or mill 6, the hot flue gas 7 from the combustion chamber 8 being guided into the drop shaft 5 and reaching also the coal mill 6. In the coal mill 6, lignite is pulverized to the required grain size and simultaneously is dried by the hot flue gas. The pulverized combustion mixture is fed through shifter 9 in the coal dust burner 10 and therefrom into the firing space or combustion chamber 8, where the coal dust is burned into flue gas and ashes. As mentioned before, a smaller portion of the flue gas is recirculated via the drop shaft 5, whereas the major part 11 flows through the boiler installation 1, which transfers its heat content to the nonillustrated heating surfaces and pipe coils. Subsequently, the flue gas passes through an ash separator 12 and suction blower 13. Then, the flue gas passes through a dust filter 23 and is discharged as a clean gas 15 through a stack 16 into the atmosphere.

A partial stream of the flue gas already being strongly cooled off to about 150° C. is selectively tapped off at connection points 26, 27, 17 or 18 as a recycle cold gas which, via return conduit 19, is recycled either simultaneously or alternately via two different return conduits into the combustion chamber 8. One return conduit communicates at connection 20 with the drop shaft 5, where the recycle coal gas is admixed to the hot flue gas, and upon flowing through the coal mill 6 and the shifter 9 is recycled through the coal dust burner 10 in the firing space or combustion chamber 8. The second return conduit 21 communicates with inlet slots 22 so that the recycle cold flue gas is applied directly in the firing space 8.

In taking the cold flue gas at tap points 26, 27 and 17, the returned cold gas is laden with ash particles whereby residual additives are recycled into the firing space. In a known manner, the additives are in great stiochiometric excess relative to the coal. When tapping off the cold recycled gas at 18, the cold flue gas is a cleaned gas.

According to the present invention, the relative moisture of the flue gas before its entry into the dust filter 23 is increased. This takes place generally in the range of the flue gas stream between the ash separator 12 and the dust filter 23.

It has already been known that, in the dry additive process, the provision of a dust filter after the firing improves the binding rate of sulfur with the ashes. Surprisingly, it has been found that the reactivity of sulfur can be still further improved when the relative moisture of the flue gas is increased.

The relative moisture increase in the flue gas can be with advantage carried out in three ways:
- cooling down the hot flue gas in a heat exchanger. The recovered heat at the same time can find additional applications, so that the efficiency of the installation is also increased;
- injecting or spraying in water into the hot flue gas streams; and
- combining the two above mentioned methods.

Normally, the temperature of the flue gas amounts to about 150° C. In increasing the relative moisture the temperature of the flue gas is reduced to a value between 50° and 100° C. The temperature of the flue gas, however, must always be higher than the condensation point of water in the flue gas, so that only dry products reach the subsequent dust filter.

It should be mentioned that conventionally flue gases discharged from the firing space cannot be cooled down to the aforementioned temperatures, inasmuch as otherwise massive corrosion by sulfuric acid would occur. This, however, does not occur during the dry additive process as used in the method of this invention, inasmuch as the additive absorbs most of the present $SO_3$. For this reason, the lowering of the temperature of the flue gas to the aforementioned value between 50° and 100° C. is feasible. By the method of this invention, it is now possible to obtain a rate of desulfurization in combustion plants operating with the dry additive process comparable with plants operating with a wet process.

Figure 2:
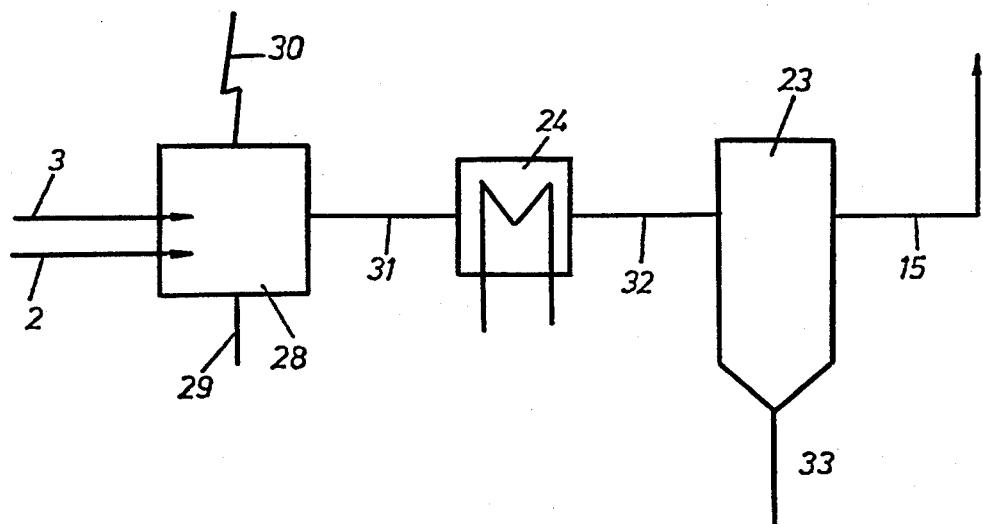
FIGS. 2 to 4 illustrate schematically different embodiments for carrying out the method of this invention.
Figure 3:
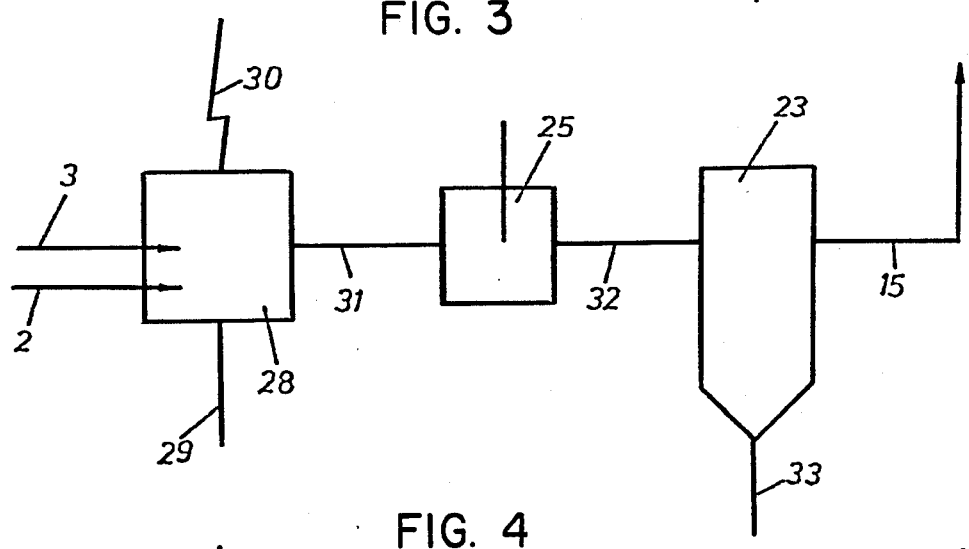
Figure 4:
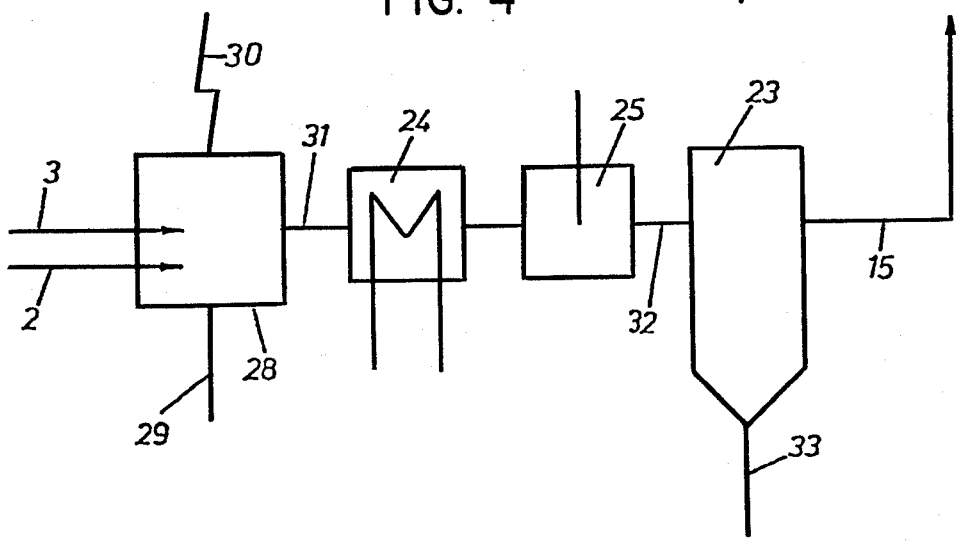

In FIGS. 2-4, the three variants mentioned above for increasing the relative moisture of the flue gas according to the invention are schematically illustrated. Reference numeral 2 denotes the coal and numeral 3 the additives, the coal being combusted in the firing space 28, whereby a part of the additives reacts with released sulfur or sulfuric compounds. A part of the ashes and additives is discharged at 29. A great part of the heat released in the combustion process is transferred at 30.

The hot flue gas laden with ashes and residual additives still capable of reacting is discharged either in a heat exchanger 24 (FIG. 2) or in an injection cooler 25 (FIG. 3) or in series-connected heat exchanger and in the injection cooler (FIG. 4). The cooled down flue gas 32 with an increased relative moisture content passes through dust filter 23 and clean gas 15 is discharged through the stack 16 into the atmosphere. The separated ashes and desulfurization products 33 are discharged in the dust filter 23.

The method and device according to this invention are not restricted to those of the illustrated examples. The boiler installation (see FIG. 1) may also work in different way. Nevertheless, it is essential that it operate according to the dry additive method whereby the discharged flue gas stream is laden with unused additives before it reaches the dust filter, so that the residual sulfur or sulfur compounds may react in the filter with the residual additives. The method of this invention is suitable for application with any kind of coal and is not limited to the use of lignite. The return of cold recycle gas in the firing space as depicted in FIG. 1 is an example of a preferred complement to this invention but is not a necessary condition for practising the invention.

For the sake of clarity, it will also be noted that the ash separator 12 in FIG. 1 is a separator for ashes from the boiler, whereas the dust filter 23 is designed for filtering flue dust. The device for carrying out the method of this invention, as described before, is arranged upstream of the dust filter 23. In this manner, the relative moisture of the flue gas is preferably increased to a value greater 50% up to 100%, preferably greater 80% up to 100%.

We claim:
1. A method of desulfurizing flue gas generated in a coal-combusting installation operating with dry additives selected from the group consisting of calcium oxide and calcium carbonate wherein coal is fired in a combustion chamber in the presence of the dry additives reacting with sulfur oxide components, then the stream of flue gas having normally a temperature of about 150° C. and being laden with ashes and residual additives is discharged from the combustion chamber and supplied to a dust filter where the flue gas is separated from the ashes and residual additives, comprising the step of increasing the relative moisture of the discharged stream before its entry in the filter by cooling the discharged stream to a lower temperature which exceeds the temperature of condensation point of water present in the stream, thus enhancing reaction of sulfur oxide components still present in the flue gas with the residual additives in the filter.

2. A method as defined in claim 1, wherein a partial stream of cold recycled flue gas is applied to the combustion chamber.

3. A method as defined in claim 1, wherein the relative increase of moisture is accomplished by cooling down the discharged stream by means of a heat exchanger and by spraying water into the discharged stream.

4. A method as defined in claim 1, wherein the temperature of the discharged stream is reduced to a value between 50° and 100° C.

5. A method as defined in claim 1, wherein the relative moisture of the discharged flue gas stream is increased to a value between 50% and 100%, preferably between 80% and 100%.

* * * * *